US 6,556,960 B1

(12) United States Patent
Bishop et al.

(10) Patent No.: US 6,556,960 B1
(45) Date of Patent: Apr. 29, 2003

(54) VARIATIONAL INFERENCE ENGINE FOR PROBABILISTIC GRAPHICAL MODELS

(75) Inventors: Christopher Bishop, Cambridge (GB); John Winn, Cheltenham (GB); David J. Spiegelhalter, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/388,268

(22) Filed: Sep. 1, 1999

(51) Int. Cl.$^7$ ............................................. G16F 17/50
(52) U.S. Cl. .............. 703/2; 703/22; 700/28; 706/22
(58) Field of Search .......... 703/2, 22; 706/22; 700/28

(56) References Cited

U.S. PATENT DOCUMENTS

| | | | | |
|---|---|---|---|---|
| 5,465,321 A | * | 11/1995 | Smyth | 395/22 |
| 5,616,504 A | * | 4/1997 | Brown et al. | 436/518 |
| 5,704,017 A | * | 12/1997 | Heckerman et al. | 395/61 |
| 6,021,403 A | * | 2/2000 | Horvitz et al. | 706/45 |
| 6,058,206 A | * | 5/2000 | Kortge | 382/159 |
| 6,212,509 B1 | * | 4/2001 | Pao et al. | 706/16 |
| 6,408,290 B1 | * | 6/2002 | Thiesson et al. | 706/52 |

OTHER PUBLICATIONS

Norsys Corporation, Netica belief network software, http://www.norsys.com/, Aug. 11, 1999.

M. Ramoni, P. Sebastiani, An introduction to the robust Bayesian classifier, Knowledge Media Institute Technical Report, KMi–TR–79, Mar. 9, 1999.

Matlab 5, Bayes Net Toolbox, http://www.cs.berkeley.edu/~murphyk/bnt.html, Jun. 4, 1999.

Dept of Computer Science, Univ. of Helsinki, Bayesian Predictive Discriminant Analysis, http://www.cs.helsinki.fi/research/cosco/projects/None/SW/, Mar. 18, 1998.

D. MacKay, Ensemble learning and evidence maximization, NIPS 1995, May 1, 1995.

Decision Systems Laboratory, GeNIe, http://www2.sis.pitt.edu/~henie/about_Genie.html, Jul. 1, 1998.

S. Srinivas, J. Breese, IDEAL, http://www.rpal.rockwell.com/ideal.html, Jan. 1, 1990.

Hugin, Introducing the Hugin System, http://www.hugin.dk/hugintro/hugin_system_pane.html, Aug. 11, 1999.

(List continued on next page.)

*Primary Examiner*—Samuel Broda
*Assistant Examiner*—T. Phan
(74) *Attorney, Agent, or Firm*—Amin & Turocy, LLP (57) ABSTRACT

A variational inference engine for probabilistic graphical models is disclosed. In one embodiment, a method includes inputting a specification for a model that has observable variables and unobservable variables. The specification includes a functional form for the conditional distributions of the model, and a structure for a graph of model that has nodes for each of the variables. The method determines a distribution for the unobservable variables that approximates the exact posterior distribution, based on the graph's structure and the functional form for the model's conditional distributions. The engine thus allows a user to design, implement and solve models without mathematical analysis or computer coding.

28 Claims, 8 Drawing Sheets

OTHER PUBLICATIONS

BUGS, Introduction to the BUGS project, http://www.mrc-bsu.cam.ac.uk/bugs/intro/www/intro.html, Aug. 11, 1999.

F. Cozman, Introduction to JavaBayes, http://www.ds.cmu.edu/~javabayes/Home/node2.html, Aug. 13, 1998.

J. Cheng, D. Bell, W. Liu, Learning Bayesian networks from data, Proc. 6th ACM Int'l Conf. Information & Knowledge Management, Jan. 1, 1997.

S.R. Waterhouse, A.J. Robinson, Non-linear prediction of acoustic vectors using hierarchical mixtures of experts, in Neural Information Processing Systems 7, MIT Press, Jan. 1, 1995.

R.M. Neal, G.E. Hinton, A view of the EM algorithm that justifies incremental-sparse and other variants, in Learning in Graphical Models, pp. 355–368 (Klewe), Jan. 1, 1998.

* cited by examiner

VARIATIONAL INFERENCE ENGINE FOR PROBABILISTIC GRAPHICAL MODELS

FIELD OF THE INVENTION

This invention relates generally to data modeling and analysis such as probabilistic graphical models, and more particularly to variational inference engines for such models.

BACKGROUND OF THE INVENTION

Data modeling has become an important tool in solving complex and large real-world computerizable problems. Applications of data modeling include data compression, density estimation and data visualization. A data modeling technique used for these and other applications is probabilistic modeling. It has proven to be a popular technique for data modeling applications such as speech recognition, vision, handwriting recognition, information retrieval and intelligent interfaces. One framework for developing such applications involves the representation of probability distributions as directed acyclic graphs, which are also known as Bayesian networks, belief networks, and probabilistic independence networks, among other terms.

Figure 2:
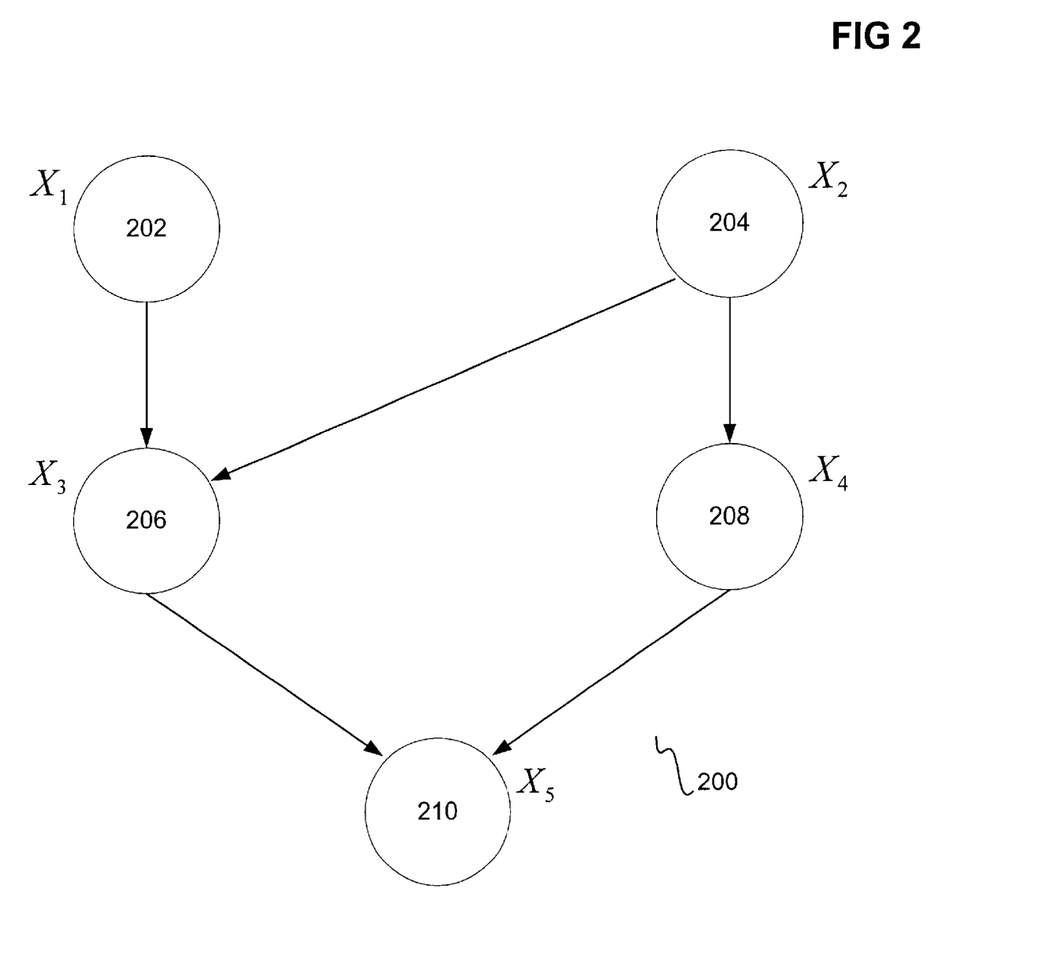
FIG. 2 is a diagram of an example directed graph having five nodes.

In a probabilistic model, there are a number of variables. Each variable is represented as a node in a directed acyclic graph. An example of such a graph is shown in the diagram of FIG. 2. The graph 200 includes nodes 202, 204, 206, 208 and 210, labeled as $X_1$, $X_2$, $X_3$, $X_4$ and $X_5$, respectively. Each node corresponds to a variable, which may correspond to either observed or observable data, or unobserved or unobservable data. For example, if the graph 200 were to correspond to a model for factors involved in starting an automobile, the observed variables might include the starting or otherwise of the engine, while the unobserved variables could include the presence of absence of fuel in the tank and the state of the battery.

The joint distribution over the variables is expressed as the product of a conditional distribution for each node, conditioned on the states of its parents in the graph, $$P(X_1, \ldots, X_M) = \prod_{i=1}^{M} P(X_i \mid pa_i)$$

where $pa_i$ denotes the parents of $X_i$. A specific model is determined by the structure of graph, as well as the choice of the conditional distributions $P(X_i|pa_i)$. For example, given the graph 200 of FIG. 2, the factorization is $$P(X_1, X_2, X_3, X_4, X_5) = P(X_1)P(X_2)P(X_3|X_1, X_2)P(X_4|X_2) P(X_5|X_3, X_4).$$

Because some of the variables are unobservable, to effectively use the model represented by the graph, it is necessary to infer the corresponding posterior distribution of at least a subset of the unobservable variables. After this is accomplished, the posterior distribution can then be used to make predictions based on the model. However, exact solutions of probabilistic models are generally intractable for all but the simplest examples. Therefore, approximation schemes are used to approximate the posterior distributions. Such approximation schemes generally fall into one of three classes: (1) Laplace's method and similar semi-analytic approximations; (2) Markov chain Monte Carlo methods, such as Gibbs sampling; and, (3) variational methods.

The last of these approximation schemes, variational methods, generally involve the introduction of a distribution that provides an approximation to the true posterior distribution. However, for each model that is to be approximated, researchers must painstakingly work out the mathematics necessary to apply variational inference, and then develop special-purpose computer code to implement the resulting variational algorithm. This can be costly, from both a time and a monetary perspective, and thus limits the usefulness of variational inference as a manner by which to develop usable probabilistic models. For this and other reasons, there is a need for the present invention.

SUMMARY OF THE INVENTION

The invention relates to a variational inference engine for probabilistic graphical models. The engine allows a user to design, implement and solve broad classes of models without recourse to mathematical analysis or computer coding. A model, for example, can be specified using a scripting language, or by the user drawing a graph of the probability distribution using a graphical user interface. The engine determines the posterior distribution, and thus allows the resulting probabilistic model to be used for prediction purposes.

In one embodiment, a computer-implemented method includes inputting a specification for a model that has observable variables and unobservable variables. The specification includes a functional form for the conditional distributions of the model, and a structure for a graph of model that has nodes for each of the variables. The model is usually such that an exact posterior distribution is intractable. The method determines a distribution for the unobservable variables that approximates the exact posterior distribution, based on the structure for the graph of the model, as well as the functional form for the conditional distributions of the model. This distribution is then output by the method.

As can be appreciated by those of ordinary skill within the art, the approach outlined herein can be extended to include the possibility of combining sampling methods, such as Markov chain Monte Carlo (e.g., Gibbs sampling) and exact methods along with variational methods, so that the engine could employ a combination of two or three different approaches to solve a particular model.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
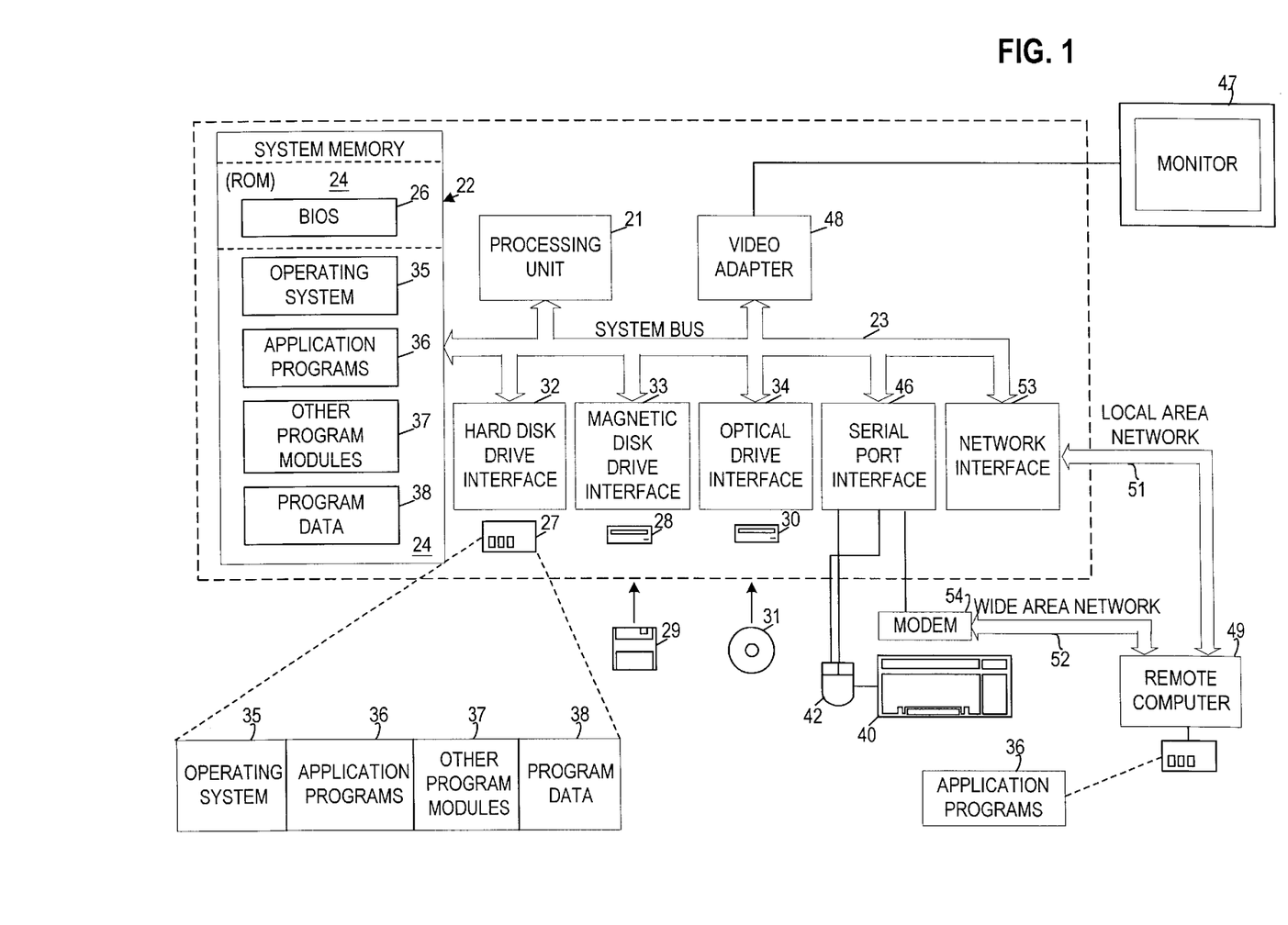
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Variational Inference

In this section of the detailed description, variational inference, also referred to as variational methods, is described, as a technique for approximating otherwise (usually) intractable probabilistic models. This background material is substantially known within the art. A probabilistic model specifies a joint distribution P(D, θ) over a set of observable variables D and an unobserved set of variables θ={θ_i}. For example, the problem of evaluating a marginal likelihood is considered:

$$P(D) = \int P(D, \theta) d\theta$$

As has been mentioned in the background section, such integrations are generally analytically intractable. Variational methods involve the introduction of a distribution Q(θ) that provides an approximation to the true posterior distribution P(θ|D). For example, the following transformation applied to the log of the marginal likelihood is considered:

$$\ln P(D) = \ln \int P(D, \theta) d\theta$$
$$= \ln \int Q(\theta) \frac{P(D, \theta)}{Q(\theta)} d\theta$$
$$\geq \int Q(\theta) \ln \frac{P(D, \theta)}{Q(\theta)} d\theta$$
$$= L(Q)$$

In this transformation, Jensen's inequality, as known within the art, has been used. The function L(Q) forms a rigorous lower bound on the true log marginal likelihood. The significance of this transformation is that, through a suitable choice for the Q distribution, the quantity L(Q) may be tractable to compute, even though the original log likelihood function is not.

It follows that the difference between the true log marginal likelihood In P(D) and the bound L(Q) is given by:

$$KL(Q\|P) = -\int Q(\theta) \ln \frac{P(\theta|D)}{Q(\theta)} d\theta$$

Figure 3:
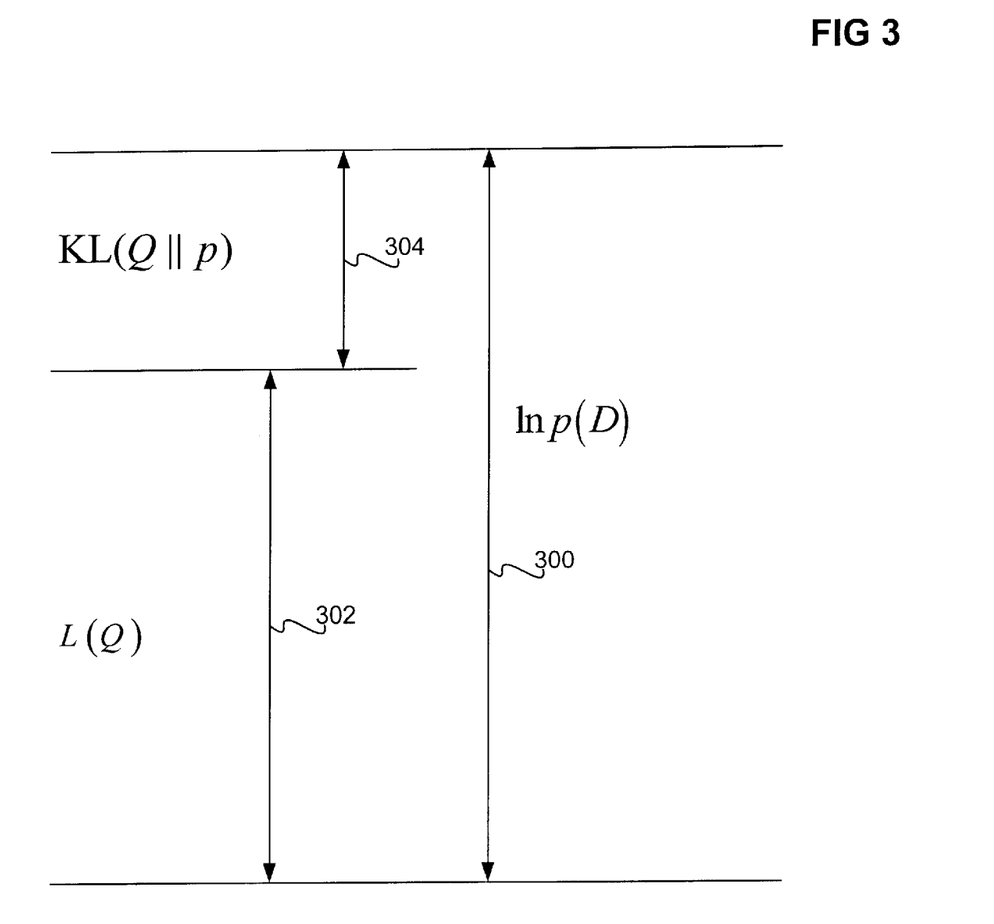
FIG. 3 is a diagram illustrating the difference between an approximation distribution and a true distribution.

This is the Kullback-Leibler (KL) divergence, as known within the art, between the approximating distribution Q(θ) and the true posterior P(θ|D). This divergence is specifically shown in the diagram of FIG. 3. The difference between the true In p(D), represented by the line 300, and the approximating L(Q), represented by the line 302, is the KL divergence, represented by the line 304.

Thus, a suitable form of Q(θ) must be chosen that is sufficiently simple (tractable) that the lower bound L(Q) can readily be evaluated and yet which is sufficiently flexible that the bound is reasonably tight, that is, that the KL divergence is minimized. This is accomplished in one embodiment by choosing some family of Q distributions, and then seeking the best approximation within this family by maximizing the lower bound. Since the true log likelihood is independent of Q, this is equivalent to minimizing the KL divergence.

For example, consider a completely free-form optimization over Q, allowing for all possible Q distributions. As known in the art, the KL divergence between two distributions Q(θ) and P(θ) is minimized by Q(θ)=P(θ). Thus, the optimal Q distribution is given by the true posterior distribution, in which case the KL divergence is zero and the bound becomes exact. However, this does not lead to any simplification of the problem. Thus, it is necessary to consider only a more restricted range of Q distributions.

In one embodiment, the functional form of Q(θ) is restricted by assuming that it factorizes over the component variables {θ_i} in θ, so that $$Q(\theta) = \prod_i Q_i(\theta_i).$$

It is noted that no specific functional form is being assumed for the component distributions $Q_i(\theta_i)$. The KL divergence is then minimized over all possible factorial distributions by performing a free-form minimization over each of the $Q_i$, such that $$Q_i(\theta_i) = \frac{\exp\langle \ln P(D, \theta)\rangle_{k \neq i}}{\int \exp\langle \ln P(D, \theta)\rangle_{k \neq j} d\theta_j},$$

where <.> denotes an expectation with respect to the distributions $Q_k(\theta_k)$ for all k≠i.

Basic Methods for Variational Inference Engine

In this section of the detailed description, basic methods for implementing a variational inference engine, according to varying embodiments of the invention, are presented. The variational inference engine is novel, and allows a user to generate a useful approximating posterior distribution without recourse to mathematical analysis or computer coding. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description.

Figure 7:
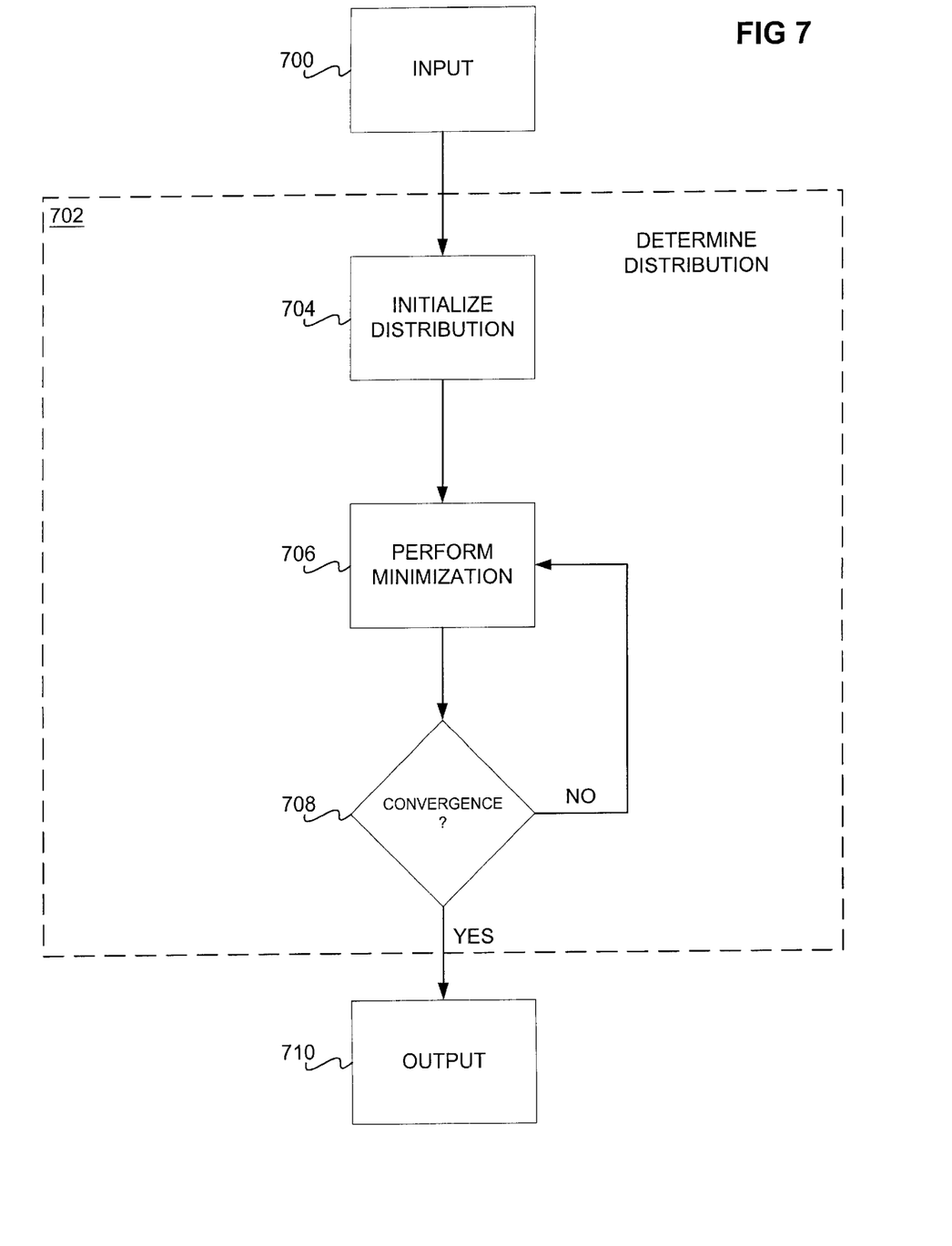

Referring to FIG. 7, a flowchart of a method according to an embodiment of the invention is shown. In 700, a specification for a model that has a plurality of observable variables and a plurality of unobservable variables is input. The model desirably represents a real-world event or events—for example, the stories read by users of a web site, the television shows watched by viewers, etc. The specification includes: (1) a functional form for the conditional distributions $P(X_i|pa_i)$, as referred to in the previous section of the detailed description, and; (2) a structure for a graph of the model. An example of a graph for a model has already been described in conjunction with FIG. 2. Specifically, the graph has a node for each observable variable, as well as a node for each unobservable variable. The exact posterior distribution of the model is usually intractable.

The invention is not limited to the manner by which input is conducted in 700. For the functional form, in one embodiment, a list of available functional forms is displayed on a computer screen, so that the user is able to select the desired functional form. For the structure of the model's graph, in one embodiment, a script language is used in which the user is able to specify the nodes and information thereabout, including the unobservable or observable variable that each node represents, the connections among the nodes, etc. In another embodiment, a graphical user interface is used in which the user is able to draw the structure of the graph on a computer screen, using an input device such as a mouse, stylus, etc.

In 702, a distribution for the unobservable variables is determined. The distribution approximates the exact posterior distribution for the model, based on the structure for the graph input in 700, and the functional form for the conditional distributions of the model also input in 700. The variational engine uses the general result $$Q_i(\theta_i) = \frac{\exp\langle \ln P(D, \theta)\rangle_{k \neq i}}{\int \exp\langle \ln P(D, \theta)\rangle_{k \neq j} d\theta_j}$$

described in the previous section of the detailed description to allow the variational solution of a wide class of models.

In one embodiment, the determination of 702 is accomplished by performing 704, 706 and 708. In 704, the distribution for the plurality of unobserved variables is initialized. Specifically, the distribution $Q(\theta)$ is made up of a number of distribution components $Q_i(\theta_i)$, such that each distribution component is initialized to a suitable starting value. In one embodiment, the components are set to appropriate randomly chosen values (for example, chosen with regard to the need to break any symmetries that may appear in the model), while in another embodiment, the components are initially set using prior knowledge specific to the problem being solved. A combination of randomly chosen values and prior knowledge may also be used. Each distribution component corresponds to an unobservable variable. The distribution $Q(\theta)$ itself has a functional form that factorizes over the plurality of unobservable variables, and which is based on the functional form for the conditional distributions input in 700.

In 706, the right-hand side of the equation $$Q_i(\theta_i) = \frac{\exp\langle \ln P(D, \theta)\rangle_{k \neq i}}{\int \exp\langle \ln P(D, \theta)\rangle_{k \neq j} d\theta_j}$$

is evaluated explicitly, by performing a free-form minimization over each distribution component in a distribution component-by-distribution component manner. In other words, for a specific choice of functional forms for the conditional distributions $P(X_i|pa_i)$, the right-hand side of this equation can be evaluated explicitly. There is one such expression for each distribution $Q_i(\theta_i)$, and in each case the expression depends on, some, or potentially all, of the remaining $Q_{k \neq i}(\theta_k)$, according to the structure of the graph. Thus, in 706, each variable is cycled through in turn, and its distribution is updated by replacing it with the expression obtained by evaluating the right-hand side of the above equation.

Figure 4:
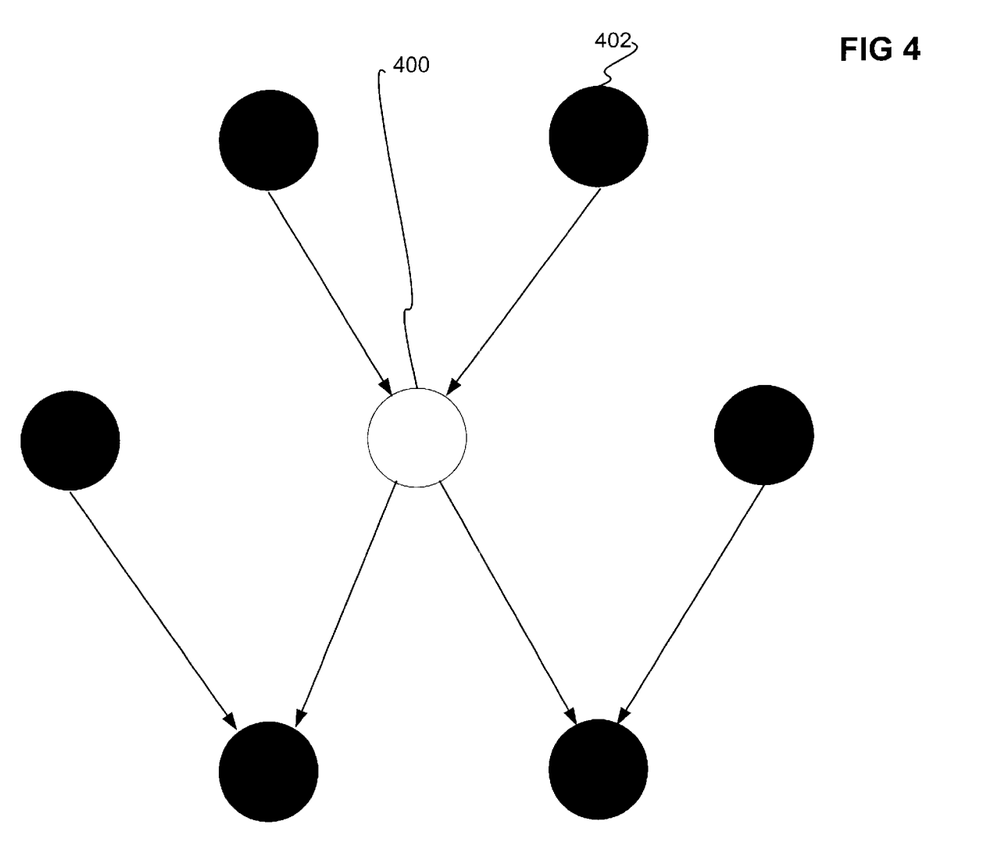
FIG. 4 is a diagram of a Markov blanket of a node.

It is noted that the update equation for any particular node depends only on the states of the other nodes in what is known in the art as a Markov blanket. This is shown in the diagram of FIG. 4. The Markov blanket for the node 400, which is depicted as a hollow circle in FIG. 4, includes the parents of the node 400, the children of the node 400, and the other parents of the children, which are depicted as filled-in circles in FIG. 4, such as the node 402. Thus, the computations required to evaluate the right-hand side of the above equation are local to the corresponding node.

Referring back to FIG. 7, in order for the cyclic update performed in 706 to be a tractable procedure, it is necessary that the expectations arising on the right-hand side of the equation $$Q_i(\theta_i) = \frac{\exp\langle \ln P(D, \theta)\rangle_{k \neq i}}{\int \exp\langle \ln P(D, \theta)\rangle_{k \neq j} d\theta_j}$$

can be evaluated analytically. It is noted that this is the case for a large class of graphical models based on what are known in the art as conjugate distributions. Specific example distributions include linear-Gaussian distributions with Wishart priors for inverse covariance matrices of the distributions and discrete distributions, as are described in succeeding sections of the detailed description.

In 708, it is determined whether a predetermined convergence criterion has been met. If not, then the method of FIG. 7 repeats performance of the free-form minimization in 706, until the criterion is met. In one embodiment of the invention, the predetermined convergence criterion assesses convergence by evaluating the lower bound on the marginal likelihood given by L(Q) in $$L(Q) = \int Q(\theta) \ln \frac{P(D, \theta)}{Q(\theta)} d\theta.$$

Substituting $$Q(\theta) = \prod_i Q_i(\theta_i)$$

into this equation, the following predetermined convergence criterion is obtained:

$$L(Q) = \int \ln P(D, \theta) \prod_i Q_i d\theta_i - \sum_i \int Q_i(\theta_i) \ln Q_i(\theta_i) d\theta_i.$$

Once the predetermined convergence criterion has been met in 708, then the method proceeds to 710, in which at least the distribution that approximates the exact posterior distribution of the model, as determined in 702, is output. The complete model, including the approximating distribution, may be output as well in one embodiment. The invention is not limited to the manner by which output is accomplished. For example, in one embodiment, output can be to a further analysis program or software component, that allows for analysis and conclusions to be drawn. As another example, output can be displayed on a displayed device, or printed to a printer, etc.

It is noted that the general variational engine described herein is intended to operate not only on general (directed, acyclic) graph structures but also for general assignments of nodes as observed (i.e., data) or hidden.

Meta Variables

In the previous sections of the detailed description, each variable of a model is described as being represented by a node within a graph for the model. This leads to, for example, a distribution component for each variable. However, in one embodiment of the invention, one or more of the unobservable variables of the model is in fact a meta variable, which represents a plurality of other unobservable variables of the model. Such meta variables are each represented by a node within the graph, such that there is a distribution component for each meta variable as well. In this section of the detailed description, specific description is provided as to meta variables and their inclusion into the variational inference engine.

In this more general situation, the $\theta_i$ represent groups of nodes, rather than individual nodes. In this case, the concept of the Markov blanket is extended to include the set of all nodes that are parents, children or coparents of nodes in the set $\theta_i$. It is noted that the user of the variational inference engine can in one embodiment be provided with some degree of choice in the form of the assume factorization of the Q distribution.

In cases of factorization over groups of variables, it is noted that further consequent factorizations of the Q distribution may arise from the interaction between the assume factorization and the graphical structure. Such factorizations can be tested for using what is referred to herein as V-separation criterion, which is now described. A set of nodes G is considered, having variables OG in which the variational posterior distribution is assumed to factorize between nodes in G and the remaining nodes. G is partitioned into two disjoint groups, $H_1$ and $H_2$. The factor $Q(\theta_G)$ in the variational posterior automatically factorizes into two terms $Q(\theta_{H1})$ and $Q(\theta_{H2})$ if the criterion as is now described holds.

Figure 5A:
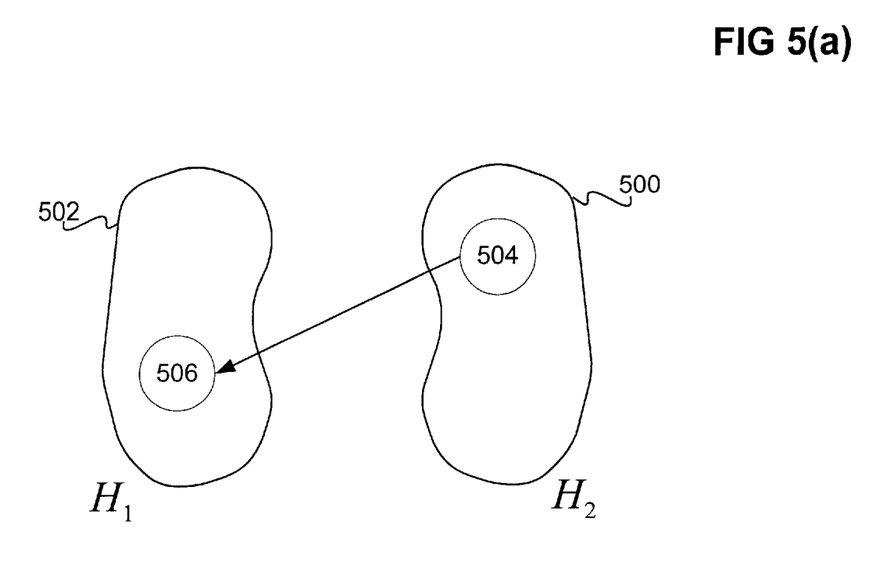
FIGS. 5(a)–5(d) are diagrams involving two partitions of a group of nodes.
Figure 5B:
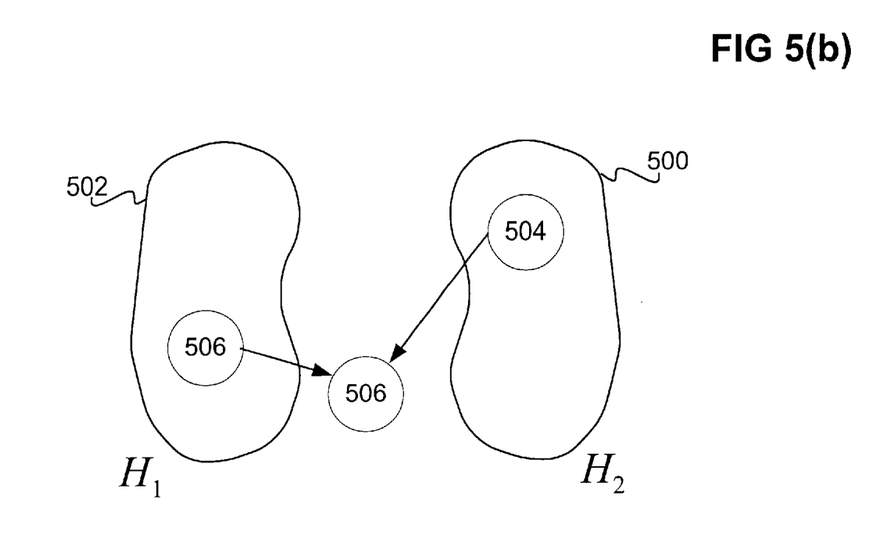
Figure 5C:
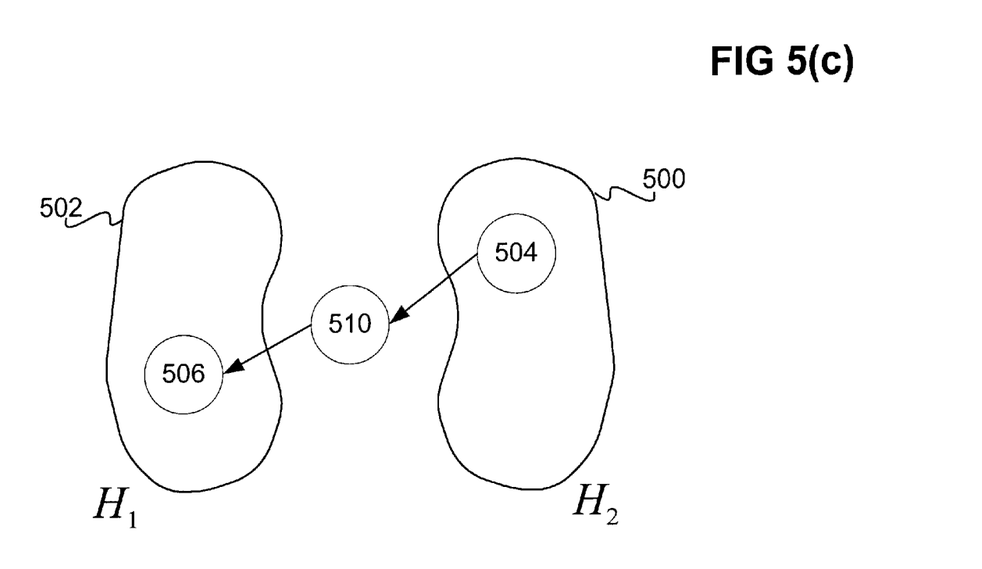
Figure 5D:
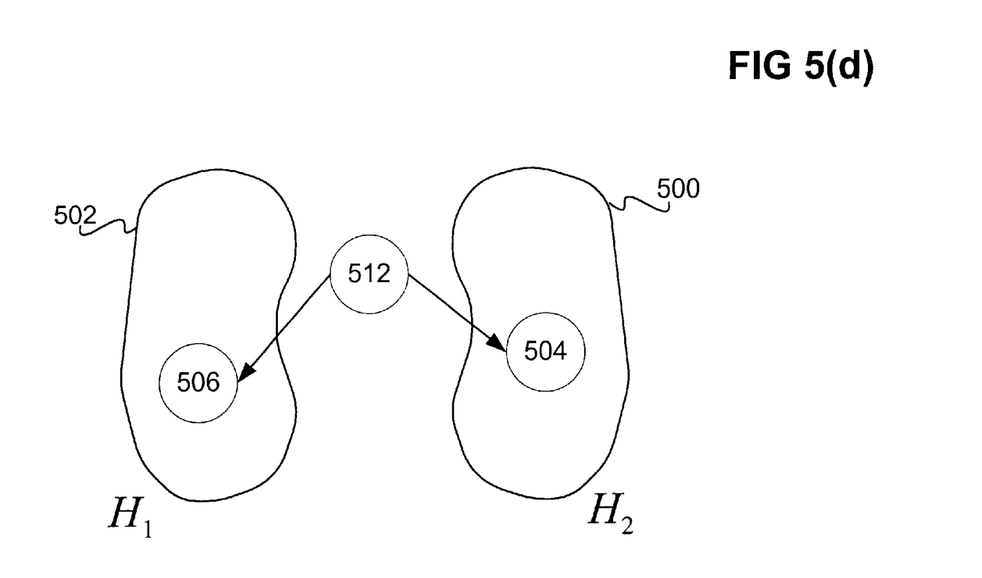

Consider all possible paths connecting any node in $H_1$ with any node in $H_2$. If these paths include a direct connection from $H_1$ to $H_2$, as shown in the diagram of FIG. 5(a), where $H_1$ is referred to as the element 502, $H_2$ is referred to as the element 500, and the nodes are referred to as the nodes 504 and 506, or a head-to-head node having a parent in $H_1$ and a parent in $H_2$ as shown in the diagram of FIG. 5(b), where the head-to-head node is referred to as the node 508, then automatic factorization will not occur. In all other cases, the optimized variational posterior will necessarily satisfy $Q(\theta_G)=Q(\theta_{H1})Q(\theta_{H2})$. Thus, a tail-to-tail node, as shown in the diagram of FIG. 5(c), where the tail-to-tail node is referred to as the node 510, or a head-to-tail node, as shown in the diagram of FIG. 5(d), where the head-to-tail node is referred to as the node 512, will not prevent factorization.

Figure 6:
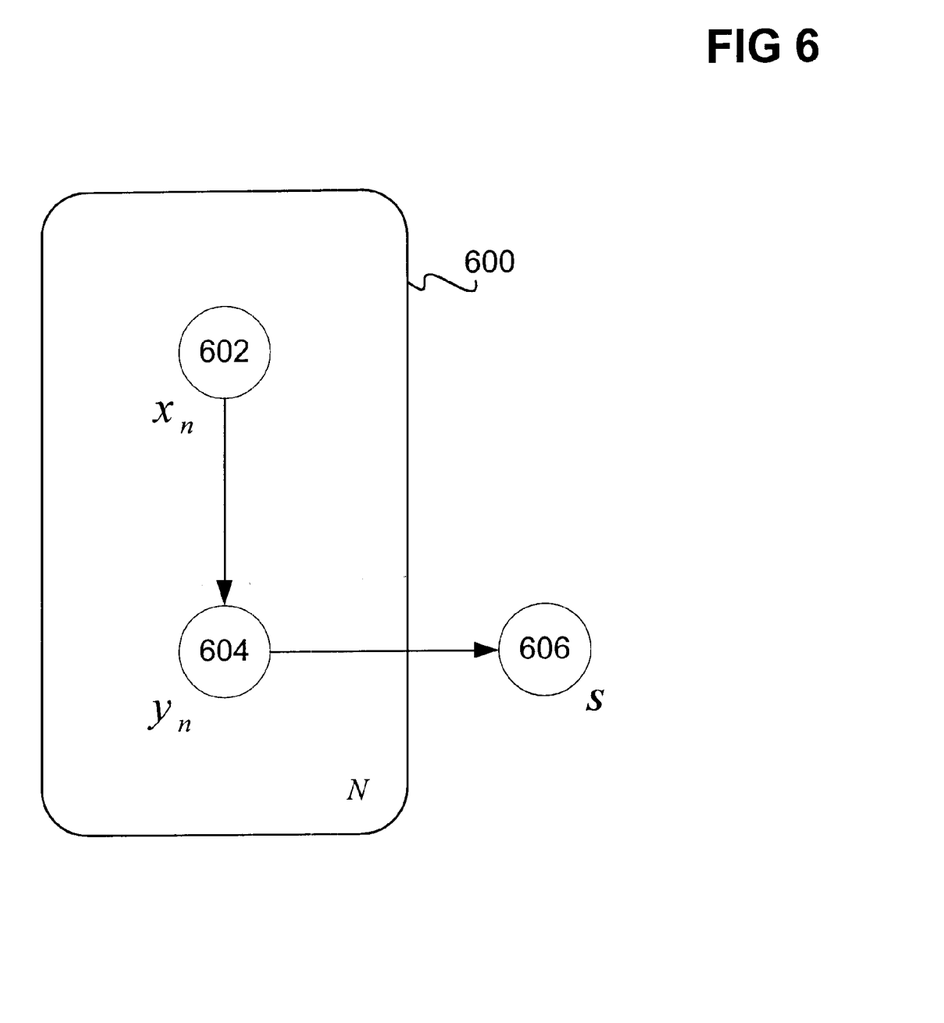
FIG. 6 is a diagram of a plate having observed variables and latent variables; and, FIG. 7 is a flowchart of a method according to an embodiment of the invention.

Using the V-separation criterion allows for testing all possible consequent factorizations within each group of variables. Wherever such a factorization is found, it is desirably exploited to avoid computational inefficiency. A common example of potential consequent factorizations arises when a graph contains a set of independent, identically distributed (i.i.d.) observed variables, possibly with corresponding i.i.d. latent variables. As shown in the diagram of FIG. 6, this is denoted as a plate 600. If each collective node (comprising all replicate members within a plate), such as the nodes 602 and 604, is assigned a joint variational posterior distribution Q, testing whether this factorizes with respect to the plate is accomplished by determining whether the members of the collective node share a common child. Thus, the composite x variable factorizes, and hence $Q(X_i, \ldots, X_N)=Q(X_i) \ldots Q(X_N)$. However, the composite y variable does not factorize, since the members share a common child S (referred to as the node 606 in FIG. 6) outside of the plate 600, and hence $Q(Y_1, \ldots, Y_N) \neq Q(Y_1) \ldots Q(Y_N)$.

In at least some embodiments of the invention, some subset of the nodes are clamped to observed variables. These are handled as follows. There is no term in the Q distribution corresponding to clamped nodes, since they are not stochastic variables. When the update equations for a factor in the Q distribution requires an expectation of some function of an observed variable, that expectation is simply replaced with the same function for the observed variable.

Linear-Gaussian Distributions

As described in a preceding section of the detailed description, it is noted that the method described in conjunction with FIG. 7 is tractable for models based on conjugate distributions. Such models include models that are based on a type of conjugate distributions known within the art as linear-Gaussian distributions. In this section of the detailed description, specific description is provided as to variational inference for models that are based on linear-Gaussian distributions.

A set of nodes is considered where each of the nodes represents a continuous (vector-valued) having a Gaussian distribution, also referred to as a normal distribution, with a mean given by a linear function of the states of its parent nodes, which themselves have Gaussian distributions of the same functional form, and with an inverse covariance matrix having what is known in the art as a Wishart distribution. The corresponding directed acyclic graph can thus have arbitrary structure, except that the Wishart nodes to not themselves have parents.

The nodes having Gaussian distributions are first considered. Specifically, a node having a Gaussian distribution over a variable x of dimension d is considered, $$P(x|\mu, \Gamma)=N(x|\mu, \Gamma^{-1}),$$

where $$N(x|\mu, \Gamma^{-1})=(2\pi)^{-d/2}|\Gamma|^{1/2}\exp\{-\tfrac{1}{2}(x-\mu)^T\Gamma(x-\mu)\}.$$

Suppose there are N children of x in the graph, which similarly having Gaussian distributions with dimensionalities $q_n$, where $n=1, \ldots, N$, so that $$P(y_n|\mu_n, A_n, x, \Gamma_n)=N(y_n|\mu_n+A_nx, \Gamma_n^{-1}).$$

The variational distribution $Q_x(x)$ is determined from $$Q_i(\theta_i) = \frac{\exp\langle \ln P(D, \theta)\rangle_{k \neq i}}{\int \exp\langle \ln P(D, \theta)\rangle_{k \neq j} d\theta_j}$$

and is a Gaussian distribution $Q_x(x)=N(x|\tilde{\mu}, \tilde{\Gamma}^{-1})$, where $$\tilde{\Gamma} = \langle \Gamma \rangle + \sum_{n=1}^{N} \langle A_n^T \Gamma_n A_n \rangle$$

$$\tilde{\mu} = \tilde{\Gamma}^{-1}\left[\langle \Gamma \rangle\langle \mu \rangle + \sum_{n=1}^{N} \langle A_n^T\rangle\langle \Gamma_n\rangle(\langle y_n \rangle - \langle \mu_n \rangle)\right].$$

Each such node makes an addition contribution to the lower bound L given by $$L(Q_x)=\tfrac{1}{2}[\langle \ln|\Gamma|\rangle - (\langle x\rangle - \langle \mu\rangle)^T \langle \Gamma\rangle(\langle x\rangle - \langle \mu\rangle) - d\ln 2\pi] + \tfrac{1}{2}[d(1+\ln 2\pi)+\ln|\tilde{\Gamma}|].$$

It is noted that the required expectations comprise first and second moments with respect to Gaussian distributions represented by other factors $Q(\theta_i)$ in the variational posterior, which are evaluated using $$\langle x \rangle = \mu$$

$$\langle xx^T \rangle = \mu\mu^T + \Gamma^{-1}.$$

The only other expectations required involve the Wishart distribution, as described below.

The prior distribution for a covariance matrix is given by a Wishart distribution $$P(\Gamma|a,B)=W(\Gamma|a,B)$$

where $$W(\Gamma|a,B)=c|\Gamma|^{a-k(k+1)/2}\exp\{-Tr(B\Gamma)\}$$

in which $c=|B|^a/\Gamma_k(a)$ with $$\Gamma_k(a) = \pi^{k(k-1)/2}\prod_{i=1}^{k}\Gamma\left(a+\frac{1}{2}-\frac{i}{2}\right)$$

and $\Gamma(a)$ is the usual Gamma function known within the art. The children of a Wishart node comprises N Gaussian nodes of the form $$P(y_n|\mu_n,\Sigma)=N(y_n|\mu_n,\Gamma^{-1}).$$

The variational posterior $Q(\Gamma)$ is also Wishart of the form $Q(\Sigma)=W(\Gamma|\tilde{a}, \tilde{B})$ where $$\tilde{a} = a + \frac{N}{2}$$

$$\tilde{B} = B + \frac{1}{2}\Sigma[\langle y_n y_n^T\rangle + \langle \mu_n\mu_n^T\rangle - 2\langle y_n\rangle\langle \mu_n\rangle]$$

Each such Wishart node makes an addition contribution to the lower bound of the form $$L(Q_\Gamma)=a\ln|B|+(a-1)\langle \ln|\Gamma|\rangle - Tr(B\langle \Gamma\rangle) - d\ln\Gamma(a) - \ln|\tilde{B}|-d[(\tilde{a}-1)\psi(\tilde{a})+\tilde{a}+\ln\Gamma(\tilde{a})]$$

where $$\langle \Gamma \rangle = \tilde{a}\tilde{B}^{-1}$$

$$\langle \ln|\Gamma|\rangle = \sum_{i=1}^{k}\psi\left(\tilde{a}+\frac{1}{2}-\frac{i}{2}\right)-\ln|\tilde{B}|$$

Bayesian PCA

It is noted that a Bayesian Principal Component Analysis (PCA) model can also be implemented using an embodiment of the invention. That is, the method described in conjunction with FIG. 7 can be applied to Bayesian PCA in one specific embodiment. Bayesian PCA is described generally in the copending and coassigned application entitled "Bayesian Principal Component Analysis," filed May 19, 1999, and assigned Ser. No. 09/314,378.

In order to apply an embodiment of the invention to Bayesian PCA a Q distribution is assumed, of the form $$Q(X, W, \alpha, \mu, \tau)=Q(X)Q(W)Q(\alpha)Q(\mu)Q(\tau)$$

where $X=\{X_n\}$. The true joint distribution of data and parameters is given by $$P(D, \theta) = \prod_{n=1}^{N} P(t_n | x_n, W, \mu, \tau)P(X)P(W|\alpha)P(\mu)P(\tau).$$

Using the result that was given before, $$Q_i(\theta_i) = \frac{\exp\langle \ln P(D, \theta)\rangle_{k \neq i}}{\int \exp\langle \ln P(D, \theta)\rangle_{k \neq j} d\theta_j},$$

together with the explicit forms for the various $P(\bullet)$ distributions, the following results for the component distributions of $Q(\bullet)$ are obtained $$Q(X) = \prod_{n=1}^{N} N(x_n | m_x^{(n)}, \Sigma_x)$$

$$Q(\mu) = N(\mu | m_\mu, \Sigma_\mu)$$

$$Q(W) = \prod_{k=1}^{d} n(\tilde{w}_k | m_w^{(k)}, \Sigma_w)$$

$$Q(\alpha) = \prod_{i=1}^{q} \Gamma(\alpha_i | \tilde{a}_\alpha, \tilde{b}_{\alpha i})$$

$$Q(\tau) = \Gamma(\tau | \tilde{a}_\tau, \tilde{b}_\tau)$$

where $\tilde{W}_k$ denotes a column vector corresponding to the kth row of W, defining $$m_x^{(n)} = \langle \tau\rangle\Sigma_x\langle W^T\rangle(t_n - \langle \mu\rangle)$$

$$\Sigma_x = (I + \langle \tau\rangle\langle W^T W\rangle)^{-1}$$

$$m_\mu = \langle \tau\rangle\Sigma_\mu\sum_{n=1}^{N}(t_n - \langle W\rangle\langle x_n\rangle)$$

$$\Sigma_\mu = (\beta + N\langle \tau\rangle)^{-1}I$$

-continued $$m_w^{(k)} = \langle \tau \rangle \Sigma_w \sum_{n=1}^{N} \langle x_n \rangle (t_{nk} - \langle \mu_k \rangle)$$

$$\Sigma_w = \left( \text{diag}\langle \alpha \rangle + \langle \tau \rangle \sum_{n=1}^{N} \langle x_n x_n^T \rangle \right)^{-1}$$

$$\tilde{a}_\alpha = a_\alpha + \frac{d}{2}$$

$$\tilde{b}_{\alpha i} = b_\alpha + \frac{\langle \|w_i\|^2 \rangle}{2}$$

$$\tilde{a}_\tau = a_\tau + \frac{Nd}{2}$$

$$\tilde{b}_\tau = b_\tau + \frac{1}{2} \sum_{n=1}^{N} \left\{ \begin{array}{l} \|t_n\|^2 + \langle \|\mu\|^2 \rangle + Tr(\langle W^T W \rangle \langle x_n x_n^T \rangle) + 2\langle \mu^T \rangle \langle W \rangle \langle x_n \rangle - \\ 2t_n^T \langle W \rangle \langle x_n \rangle - 2t_n^T \langle \mu \rangle \end{array} \right\}$$

and diag$\langle \alpha \rangle$ denotes a diagonal matrix whose diagonal elements are given by $\langle \alpha_i \rangle$.

It is noted that some additional factorization in $Q(X)$, $Q(W)$ and $Q(\alpha)$ is automatically obtained, that was not assumed in the original Q distribution.

The solution for the optimal factors in the $Q(\theta)$ distribution is an implicit one since each distribution depends on moments of the other distributions. A solution is found numerically by starting with a suitable initial guess for the distributions and then cycling through the groups of variables in turn, re-estimating each distribution using the above results. Note that at each re-estimation step only moments of those variables contained in the corresponding Markov blanket are needed.

The required moments are evaluated using the result that, for a Gaussian distribution $N(x|\mu,\Sigma)$ $$\langle x \rangle = \mu$$

$$\langle xx^T \rangle = \Sigma + \mu\mu^T.$$

In order to monitor the convergence of the variational optimization it is convenient to be able to evaluate the lower bound L(Q) on the marginal log likelihood. As well as monitoring the evolution of the bound during training, the derivatives of the bound with respect to the parameters of the Q distribution at the end of the optimization process are evaluated numerically using central differences to confirm that they are indeed close to zero.

Discrete Distributions

As described in a preceding section of the detailed description, it is noted that the method described in conjunction with FIG. 7 is tractable for models based on conjugate distributions. Such models include models that are based on a type of conjugate distributions known within the art as discrete distributions, where the nodes of the graph of such a model include discrete and what is known in the art as Dirichlet nodes, such that the Dirichlet nodes have no parents. In this section of the detailed description, specific description is provided as to variational inference for models that are based on discrete distributions such as these.

First, a discrete distribution is considered. Node x has discrete prior distribution with conditional probability table A indexed by parents $Z = \{Z_1 \ldots Z_j\}$. It is a parent of N discrete nodes $y^n$, each of which has additional parents.

$$P(x|z,A) = A_{x,z}$$

$$P(y^n|\{x,w^n\}, B^n) = B_{y^n,x,w^n}.$$

The form of the variational distribution is a probability table:

$$Q(X=x|C_x) = C_x(x).$$

Variational optimization leads to the following update rule:

$$C_x(x) = \frac{1}{Z} \prod_z \exp\left[ \prod_{j=1}^{J} C_{z_j}(z_j) \langle \ln A_{x,z} \rangle \right] \times$$

$$\prod_{n=1}^{N} \prod_{y^n} \prod_{w^n} \exp\left[ C_{y^n}(y^n) \prod_{k=1}^{K_n} C_{w_k^n}(w_k^n) \langle \ln B_{y^n,x,w^n} \rangle \right].$$

Each discrete node makes a contribution to the lower bound of the form, $$L(x) = \sum_x \sum_z C_x(x) \prod_{j=1}^{J} C_{z_j}(z_j) \langle \ln A_{x,z} \rangle - \sum_x C_x(x) \ln C_x(x)$$

The availability of $C_x$ allows any required marginals to be passed to other nodes.

Next, a Dirichlet distribution is considered. Node $\alpha$ has a Dirichlet prior distribution with hyperparameters u. Its children are N discrete nodes $y_n$, with parents $\{w_1^n \ldots w_{k_n}^n\}$. For each $y_n$, it acts as a column of the conditional probability table for a configuration of its parents $\tilde{w}^n$.

$$P(a|u) = \frac{1}{Z(u)} \prod_{i=1}^{I} a_i^{u_i - 1}$$

$$P(y^n|w^n = \tilde{w}^n, a) = a_{y^n}.$$

The variational distribution is also Dirichlet. It has hyperparameters $\tilde{u}$ that are updated using $$\tilde{u}_i = u_i + \sum_{n=1}^{N} C_{y^n}(i) \prod_{k=1}^{K_n} c_{w_k^n}(\tilde{w}_k^n).$$

Typically, a node $y_n$ has a Dirichlet prior for every configuration of its parents, leading to a prior that is a product of Dirichlet distributions. A consequence of variational optimization is that each of these remains independent, allowing each to be updated individually. The value (ln $a_1$) in the discrete update equations is found using:

$$\langle \ln a_i \rangle = \psi(\tilde{u}_i) - \psi\left( \sum_i \tilde{u}_i \right).$$

Each Dirichlet node makes a contribution to the lower bound, excluding constants, of the form $$L(a) = \sum_{i=1}^{I} (u_i - 1)\langle \ln a_i \rangle + \sum_{i=1}^{I} (\tilde{u}_i - 1)\langle \ln a_i \rangle.$$

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for a variational inference engine comprising:

inputting a specification for a model having a plurality of observable variables and a plurality of unobservable variables, the specification including a functional form for a plurality of conditional distributions of the model and a structure for a graph of the model having nodes for each of the plurality of observable variables and the plurality of unobservable variables;

determining a distribution for the plurality of unobservable variables that approximates the true posterior distribution based on the structure for the graph of the model and the functional form for the plurality of conditional distributions of the model, using variational methods; and, outputting at least the distribution that approximates the true posterior distribution of the model.

2. The method of claim 1, wherein determining a distribution that approximates the true posterior distribution of the model comprises:

initializing the distribution for the plurality of unobservable variables, the distribution having a plurality of distribution components corresponding to the plurality of unobservable variables, and a functional form that factorizes over the plurality of unobservable variables and that is based on the functional form for the plurality of conditional distributions of the model;

performing a free-form minimization over each distribution component in a distribution component-by-distribution component manner; and, repeating performance of the free-form minimization until a predetermined convergence criterion has been met.

3. The method of claim 1, wherein at least one of the plurality of unobservable variables is a meta variable representing a plurality of other unobservable variables.

4. The method of claim 1, wherein the functional form for the plurality of conditional distributions of the model comprises a conjugate distribution form.

5. The method of claim 1, wherein the functional form for the plurality of conditional distributions comprises a linear-Gaussian distribution form with Wishart priors for inverse covariance matrices of the distributions.

6. The method of claim 1, wherein the functional form for the plurality of conditional distributions is such that Bayesian Principal Component Analysis (PCA) is implemented.

7. The method of claim 1, wherein the functional form for the plurality of conditional distributions comprises a discrete distribution form having discrete nodes.

8. The method of claim 1, wherein the functional form for the plurality of conditional distributions comprises a discrete distribution form having Dirichlet nodes.

9. The method of claim 1, wherein inputting a specification comprises displaying a list of plurality of function forms for a user to select the functional form.

10. The method of claim 1, wherein inputting a specification comprises inputting a script representing the structure for the graph.

11. The method of claim 1, wherein inputting a specification comprises providing a graphical user interface for a user to draw the structure of the graph.

12. The method of claim 1, wherein outputting at least the distribution comprises outputting the model including the distribution that approximates the true posterior distribution of the model.

13. A computer-implemented method for a variational inference engine comprising:

inputting a specification for a model having a plurality of observable variables and a plurality of unobservable variables, the specification including a functional form for a plurality of conditional distributions of the model and a structure for a graph of the model having nodes for each of the plurality of observable variables and the plurality of unobservable variables;

initializing a distribution for the plurality of unobservable variables that approximates the true posterior distribution, the distribution having a plurality of distribution components corresponding to the plurality of unobservable variables and that is based on the functional form for the plurality of conditional distributions of the model;

performing a free-form minimization over each distribution component in a distribution component-by-distribution component manner;

repeating performance of the free-form minimization until a predetermined convergence criterion has been met; and, outputting at least the distribution that approximates the true posterior distribution of the model.

14. The method of claim 13, wherein at least one of the plurality of unobservable variables is a meta variable representing a plurality of other unobservable variables.

15. The method of claim 13, wherein the functional form for the plurality of conditional distributions of the model comprises a conjugate distribution form.

16. The method of claim 13, wherein the functional form for the plurality of conditional distributions comprises one of: a linear-Gaussian distribution form with Wishart priors for inverse covariance matrices of the distributions, and, a discrete distribution form having discrete nodes.

17. The method of claim 13, wherein inputting a specification comprises at least one of:

displaying a list of a plurality of function forms for a user to select the functional form, inputting a script representing the structure for the graph, and providing a graphical user interface for a user to draw the structure of the graph.

18. The method of claim 13, wherein outputting at least the distribution comprises outputting the model including the distribution that approximates the true posterior distribution of the model.

19. A machine-readable medium having instructions stored thereon for execution by a processor to perform a method for a variational inference engine comprising:

inputting a specification for a model having a plurality of observable variables and a plurality of unobservable variables, the specification including a functional form for a plurality of conditional distributions of the model and a structure for a graph of the model having nodes for each of the plurality of observable variables and the plurality of unobservable variables;

determining a distribution for the plurality of unobservable variables that approximates the true posterior distribution based on the structure for the graph of the model and the functional form for the plurality of conditional distributions of the model, using variational methods; and, outputting at least the distribution that approximates the true posterior distribution of the model.

20. The medium of claim 19, wherein determining a distribution that approximates the true posterior distribution of the model comprises:

initializing the distribution for the plurality of unobservable variables, the distribution having a plurality of distribution components corresponding to the plurality of unobservable variables, and a functional form that factorizes over the plurality of unobservable variables, and a functional form that factorizes over the plurality of unobservable variables and that is based on the functional form for the plurality of conditional distributions of the model;

performing a free-form minimization over each distribution component in a distribution component-by-distribution component manner; and, repeating performance of the free-form minimization until a predetermined convergence criterion has been met.

21. The medium of claim 19, wherein at least one of the plurality of unobservable variables is a meta variable representing a plurality of other unobservable variables.

22. The medium of claim 19, wherein the functional form for the plurality of conditional distributions of the model comprises a conjugate distribution form.

23. The medium of claim 19, wherein the functional form for the plurality of conditional distributions comprises one of: a linear-Gaussian distribution form with Wishart priors for inverse covariance matrices of the distributions, and, a discrete distribution form having discrete nodes.

24. The medium of claim 19, wherein inputting a specification comprises at least one of:

displaying a list of a plurality of function forms for a user to select the functional form, inputting a script representing the structure for the graph, and providing a graphical user interface for a user to draw the structure of the graph.

25. A computer-readable medium having instructions stored thereon for execution by a processor to perform a method for a variational inference engine comprising:

inputting a specification for a model having a plurality of observable variables and a plurality of unobservable variables, the specification including a functional form for a plurality of conditional distributions of the model and a structure for a graph of the model having nodes for each of the plurality of observable variables and the plurality of unobservable variables;

initializing a distribution for the plurality of unobservable variables that approximates the true posterior distribution, the distribution having a plurality of distribution components corresponding to the plurality of unobservable variables, and a functional form that factorizes over the plurality of unobservable variables and that is based on the functional form for the plurality of conditional distributions of the model;

performing a free-form minimization over each distribution component in a distribution component-by-distribution component manner;

repeating performance of the free-form minimization until a predetermined convergence criterion has been met; and, outputting at least the distribution that approximates the true posterior distribution of the model.

26. The medium of claim 25, wherein at least one of the plurality of unobservable variables is a meta variable representing a plurality of other unobservable variables.

27. The medium of claim 25, wherein the functional form for the plurality of conditional distributions of the model comprises a conjugate distribution form.

28. The medium of claim 25, wherein inputting a specification comprises at least one of:

displaying a list of a plurality of function forms for a user to select the functional form, inputting a script representing the structure for the graph, and providing a graphical user interface for a user to draw the structure of the graph.

* * * * *